(12) United States Patent
Min et al.

(10) Patent No.: US 10,863,585 B2
(45) Date of Patent: Dec. 8, 2020

(54) METHODS FOR DYNAMIC MULTI-BAND LAYER-1 AGGREGATION IN A WIRELESS LOCAL AREA NETWORK (WLAN) NETWORK

(71) Applicant: Intel Corporation, Santa Clara, CA (US)

(72) Inventors: Alexander W. Min, Portland, OR (US); Laurent Cariou, Portland, OR (US); Thomas J. Kenney, Portland, OR (US); Rath Vannithamby, Portland, OR (US); Ravikumar Balakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/433,116

(22) Filed: Jun. 6, 2019

(65) Prior Publication Data
US 2019/0297674 A1 Sep. 26, 2019

Related U.S. Application Data

(60) Provisional application No. 62/681,215, filed on Jun. 6, 2018, provisional application No. 62/681,223, filed on Jun. 6, 2018.

(51) Int. Cl.
| | |
|---|---|
| *H04W 88/10* | (2009.01) |
| *H04W 80/08* | (2009.01) |
| *H04W 72/04* | (2009.01) |
| *H04W 56/00* | (2009.01) |

(Continued)

(52) U.S. Cl.
CPC ........... *H04W 88/10* (2013.01); *H04L 1/0003* (2013.01); *H04L 1/0061* (2013.01);
(Continued)

(58) Field of Classification Search
CPC ..... H04W 88/10; H04W 80/02; H04W 80/08; H04W 72/0453; H04W 72/0446;
(Continued)

(56) References Cited

U.S. PATENT DOCUMENTS

| | | | | |
|---|---|---|---|---|
| 2009/0274096 | A1* | 11/2009 | Fu | H04W 72/0453 370/328 |
| 2011/0305288 | A1* | 12/2011 | Liu | H04L 47/10 375/260 |

(Continued)

*Primary Examiner* — Warner Wong
(74) *Attorney, Agent, or Firm* — Schwegman Lundberg & Woessner, P.A.

(57) ABSTRACT

Embodiments of an access point (AP), station (STA), and method of communication are generally described herein. The AP may perform channel sensing in a first channel of a first frequency band and a second channel of a second frequency band to obtain access for transmission of a physical layer convergence procedure (PLCP) protocol data unit (PPDU) that comprises multiple subframes. The transmission of the PPDU may be configurable to use a multi-band layer-1 aggregation of the first and second channels. While the second channel is unavailable, the AP may transmit one or more subframes on the first channel without usage of the multi-band layer-1 aggregation. When it is determined that the second channel has become available, the AP may switch to synchronized transmission of the subframes on the first and second channels in accordance with the multi-band layer-1 aggregation.

17 Claims, 15 Drawing Sheets

(51) Int. Cl.
*H04W 80/02* (2009.01)
*H04L 1/00* (2006.01)
*H04L 1/16* (2006.01)
*H04W 4/80* (2018.01)
*H04W 84/12* (2009.01)
*H04L 5/00* (2006.01)

(52) U.S. Cl.
CPC ............ *H04L 1/1621* (2013.01); *H04W 4/80* (2018.02); *H04W 56/001* (2013.01); *H04W 72/0446* (2013.01); *H04W 72/0453* (2013.01); *H04W 80/02* (2013.01); *H04W 80/08* (2013.01); *H04L 5/0007* (2013.01); *H04L 5/0035* (2013.01); *H04W 84/12* (2013.01)

(58) Field of Classification Search
CPC . H04W 56/001; H04W 36/0069; H04W 4/80; H04L 1/0003; H04L 1/0061; H04L 1/1621; H04L 5/00; H04L 5/0007; H04L 5/0035; H04L 67/2833; H04L 45/245; H04L 47/41; H04L 47/827; H04L 25/0208
See application file for complete search history.

(56) References Cited

U.S. PATENT DOCUMENTS

| | | | |
|---|---|---|---|
| 2012/0026997 A1* | 2/2012 | Seok | H04W 36/06 370/338 |
| 2012/0082045 A1* | 4/2012 | Liu | H04L 5/001 370/252 |
| 2012/0082147 A1* | 4/2012 | Liu | H04L 5/0007 370/338 |
| 2014/0064101 A1* | 3/2014 | Hart | H04L 27/0006 370/241 |
| 2015/0296454 A1* | 10/2015 | Lee | H04W 52/0209 370/311 |
| 2016/0302200 A1* | 10/2016 | Yang | H04L 5/001 |
| 2018/0048509 A1* | 2/2018 | Huang | H04L 1/0091 |
| 2018/0115488 A1* | 4/2018 | Abraham | H04W 76/27 |
| 2018/0278697 A1* | 9/2018 | Cariou | H04Q 11/0428 |
| 2018/0279170 A1* | 9/2018 | Sakamoto | H04L 27/2692 |
| 2019/0045508 A1* | 2/2019 | Cariou | H04L 5/001 |
| 2019/0387435 A1* | 12/2019 | Cariou | H04W 28/12 |
| 2020/0221308 A1* | 7/2020 | Liao | H04W 16/14 |

* cited by examiner

METHODS FOR DYNAMIC MULTI-BAND LAYER-1 AGGREGATION IN A WIRELESS LOCAL AREA NETWORK (WLAN) NETWORK

PRIORITY CLAIM

This application claims priority under 35 USC 119(e) to U.S. Provisional Patent Application Ser. No. 62/681,215, filed Jun. 6, 2018, and to U.S. Provisional Patent Application Ser. No. 62/681,223, filed Jun. 6, 2018, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus to enable layer-1 aggregation, including but not limited to dynamic layer-1 aggregation.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
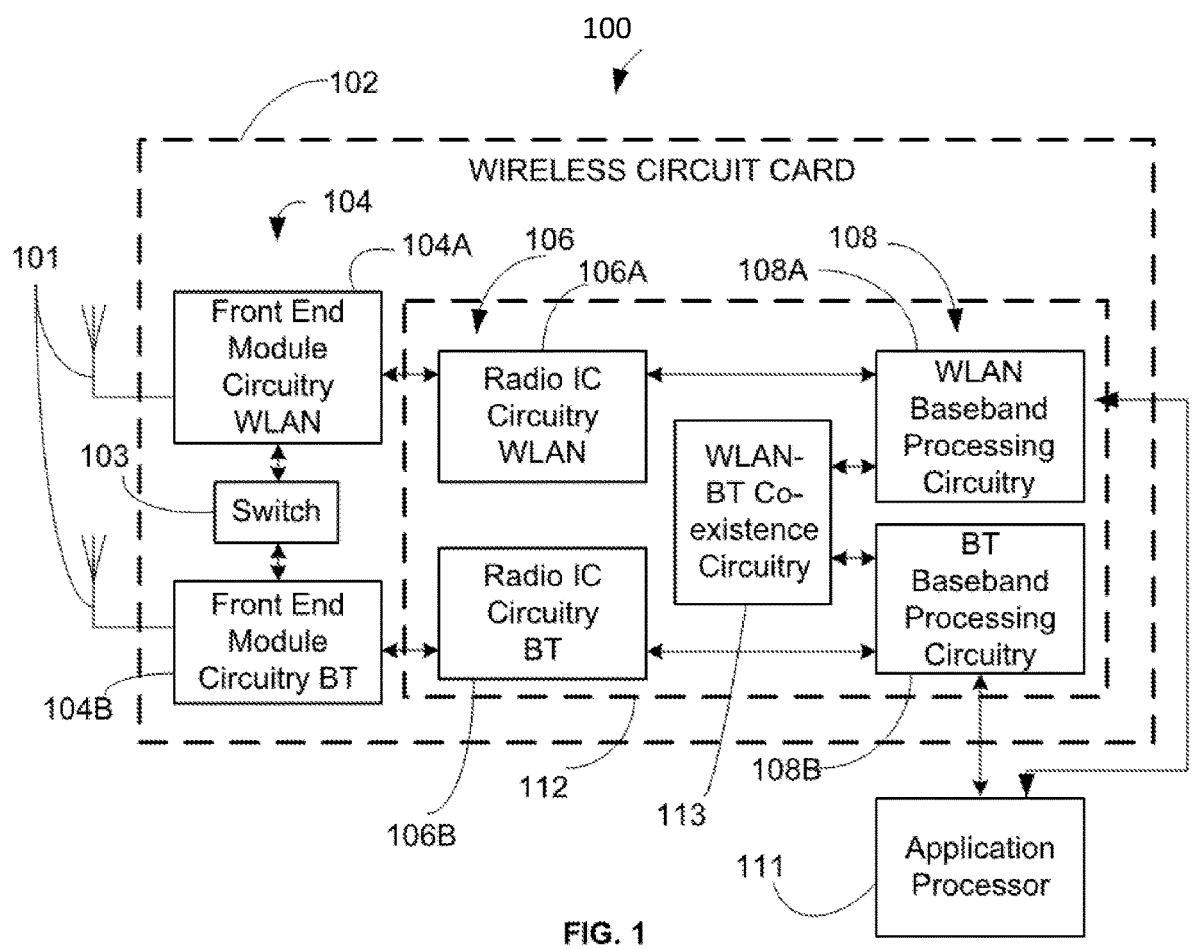
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11p, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, 6 GHz and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
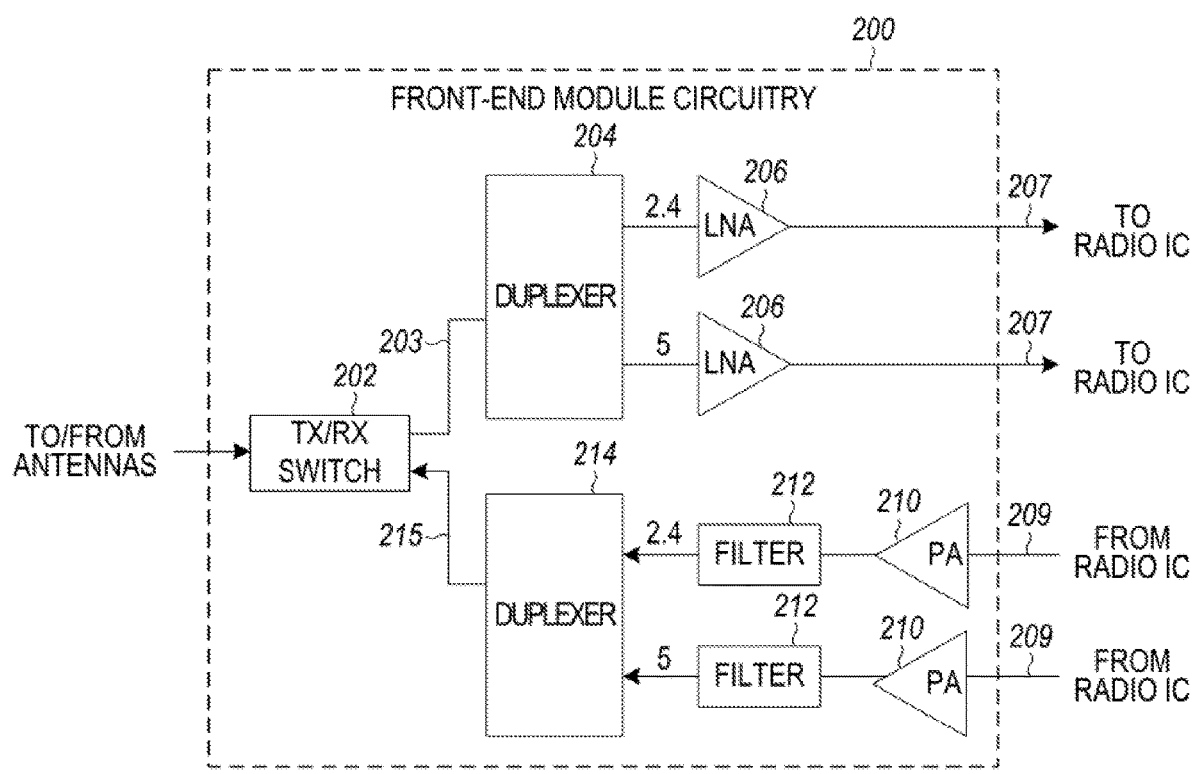
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHz signal paths and may utilize the same FEM circuitry 200 as the one used for WLAN communications.

Figure 3:
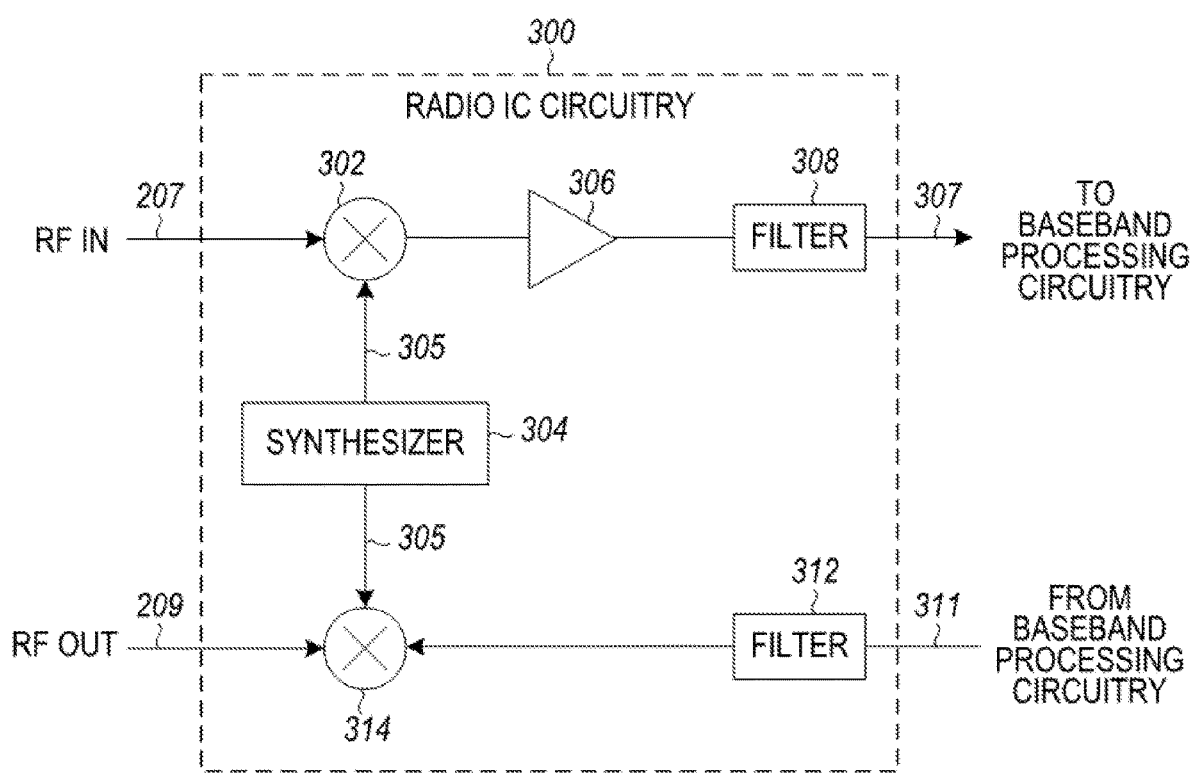
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
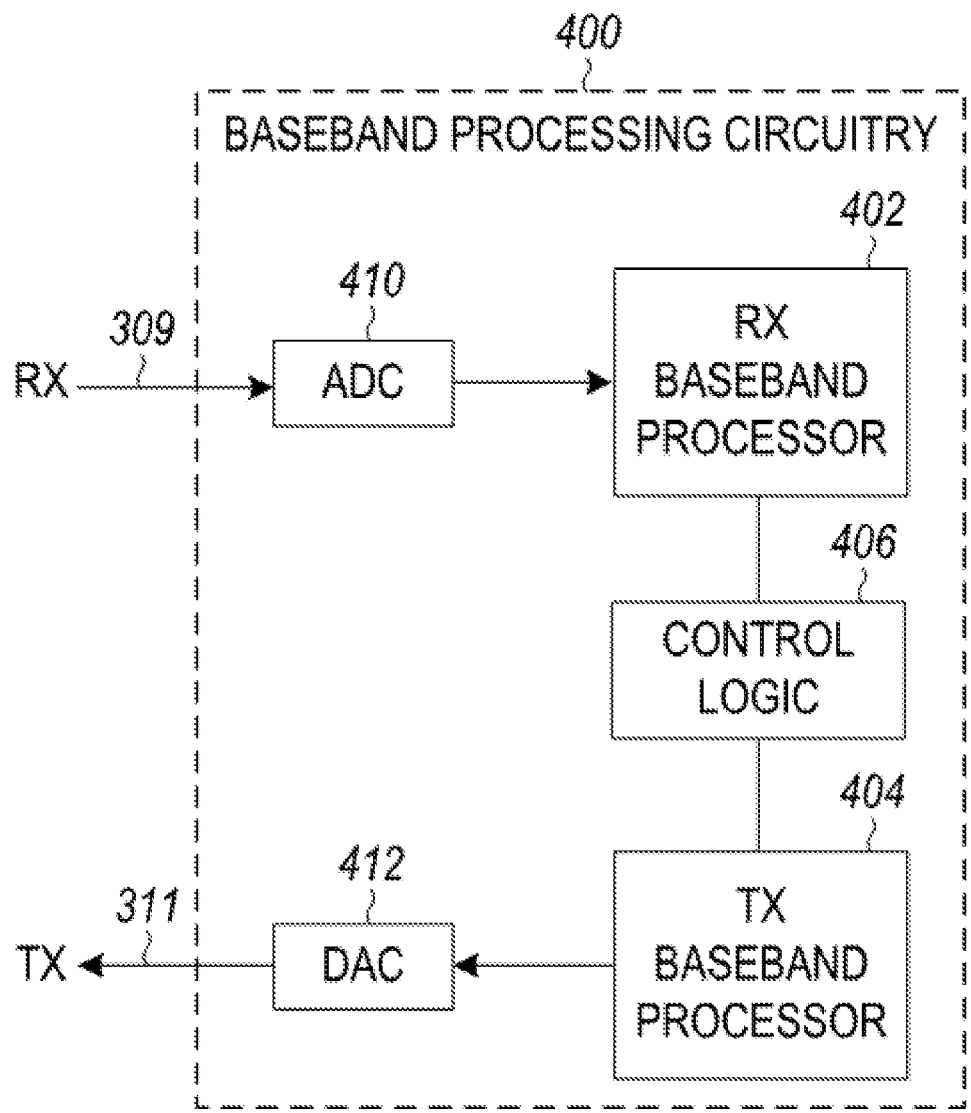
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
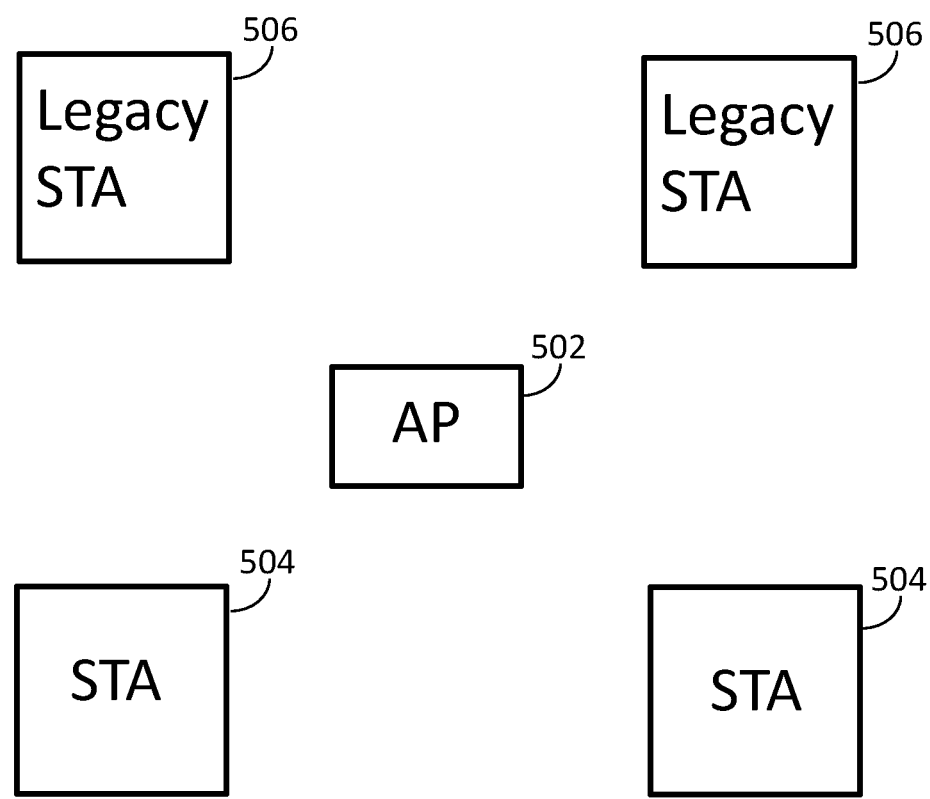
FIG. 5 illustrates a WLAN in accordance with some embodiments.

FIG. 5 illustrates a WLAN 500 in accordance with some embodiments. The WLAN 500 may include one or more APs 502, one or more STAs 504, one or more legacy STAs 506 and/or other elements. In some embodiments, the WLAN 500 may not necessarily include all of the elements shown in FIG. 5.

The legacy devices 506 may operate in accordance with one or more of IEEE 802.11 a/b/g/n/p/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11p or another wireless protocol.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE (High Efficiency) PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

Some embodiments relate to HE communications. In accordance with some IEEE 802.11 embodiments, e.g., IEEE 802.11ax embodiments, an AP 502 may operate as a master station which may be arranged to contend for a wireless medium (e.g., during a contention period) to receive exclusive control of the medium for an HE control period. In some embodiments, the HE control period may be termed a transmission opportunity (TXOP). The AP 502 may transmit a HE master-sync transmission, which may be a trigger frame or HE control and schedule transmission, at the beginning of the HE control period. The AP 502 may transmit a time duration of the TXOP and sub-channel information. During the HE control period, STAs may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the AP 502 may communicate with STAs using one or more HE frames. During the HE control period, the STAs may operate on a sub-channel smaller than the operating range of the AP 502. During the HE control period, legacy stations refrain from communicating. The legacy stations may need to receive the communication from the AP 502 to defer from communicating.

In accordance with some embodiments, during the TXOP the STAs may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

In example embodiments, the STA, an apparatus of the STA 504, a device and/or an apparatus of the device may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with one or more of the FIGs described herein.

In example embodiments, the STA 504 and/or the AP 502 are configured to perform the methods and operations/functions described herein in conjunction with one or more of the FIGs described herein. The term Wi-Fi may refer to one or more of the IEEE 802.11 communication standards. In some embodiments, an HE STA may refer to an STA configured to operate as an HE STA.

Figure 6:
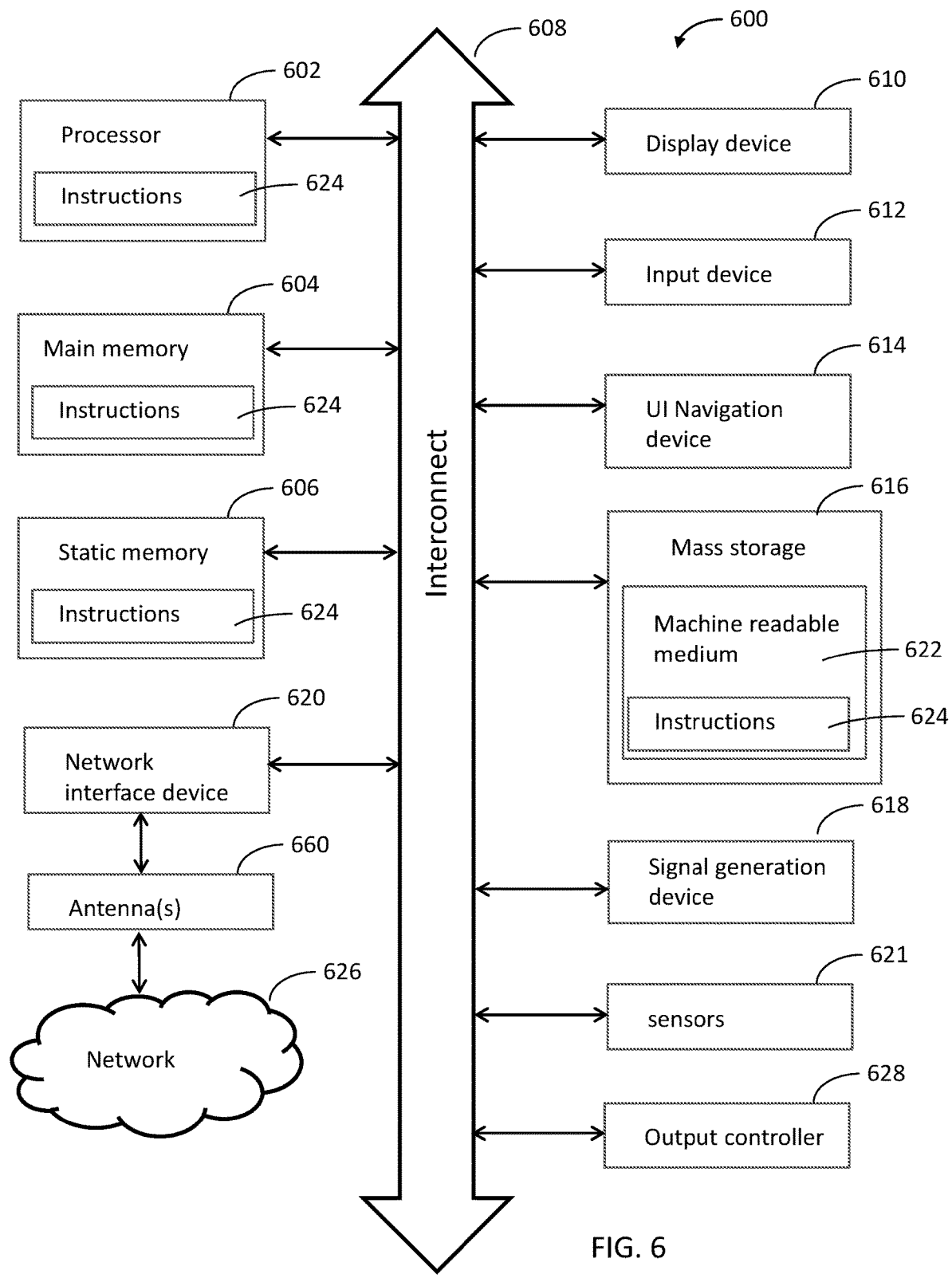
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, legacy STA 506, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
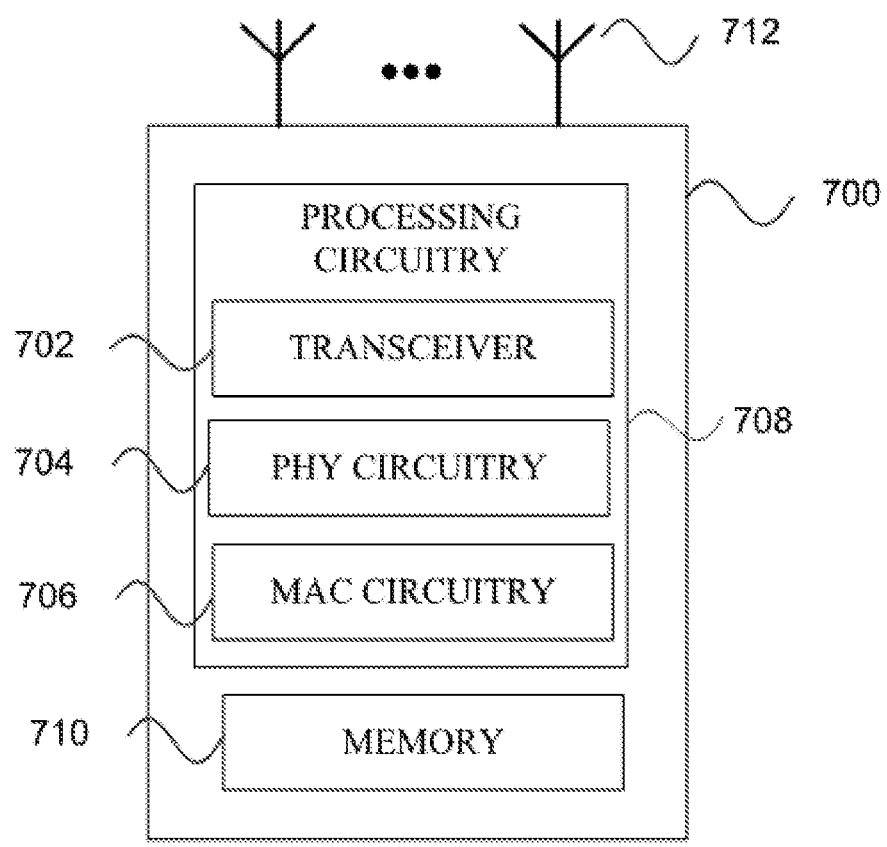
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be an AP 502, STA 504, legacy STA 506 (e.g., FIG. 5). An AP 502, STA 504, legacy STA 506, HE device and/or other device may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504, legacy STA 506 and/or other device) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502, STA 504, legacy STA 506 and/or other device), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the AP 502 may perform channel sensing in a first channel of a first frequency band and a second channel of a second frequency band to obtain access for transmission of a physical layer convergence procedure (PLCP) protocol data unit (PPDU). The transmission of the PPDU may be configurable to use a multi-band layer-1 aggregation of the first and second channels. The PPDU may comprise multiple subframes. The AP 502 may, if it is determined, based on the channel sensing of the first and second channels, that the first channel is available and that the second channel is unavailable: encode one or more of the subframes for transmission on the first channel without usage of the multi-band layer-1 aggregation while the second channel is unavailable; refrain from transmission of the subframes on the second channel while the second channel is unavailable; and, when it is determined that the second channel has become available, encode a header of one of the subframes transmitted on the first channel to indicate a switch, by the AP 502, from transmission of the subframes on the first channel without the multi-band layer-1 aggregation, to synchronized transmission of subframes on the first and second channels in accordance with the multi-band layer-1 aggregation. These embodiments are described in more detail below.

Figure 8:
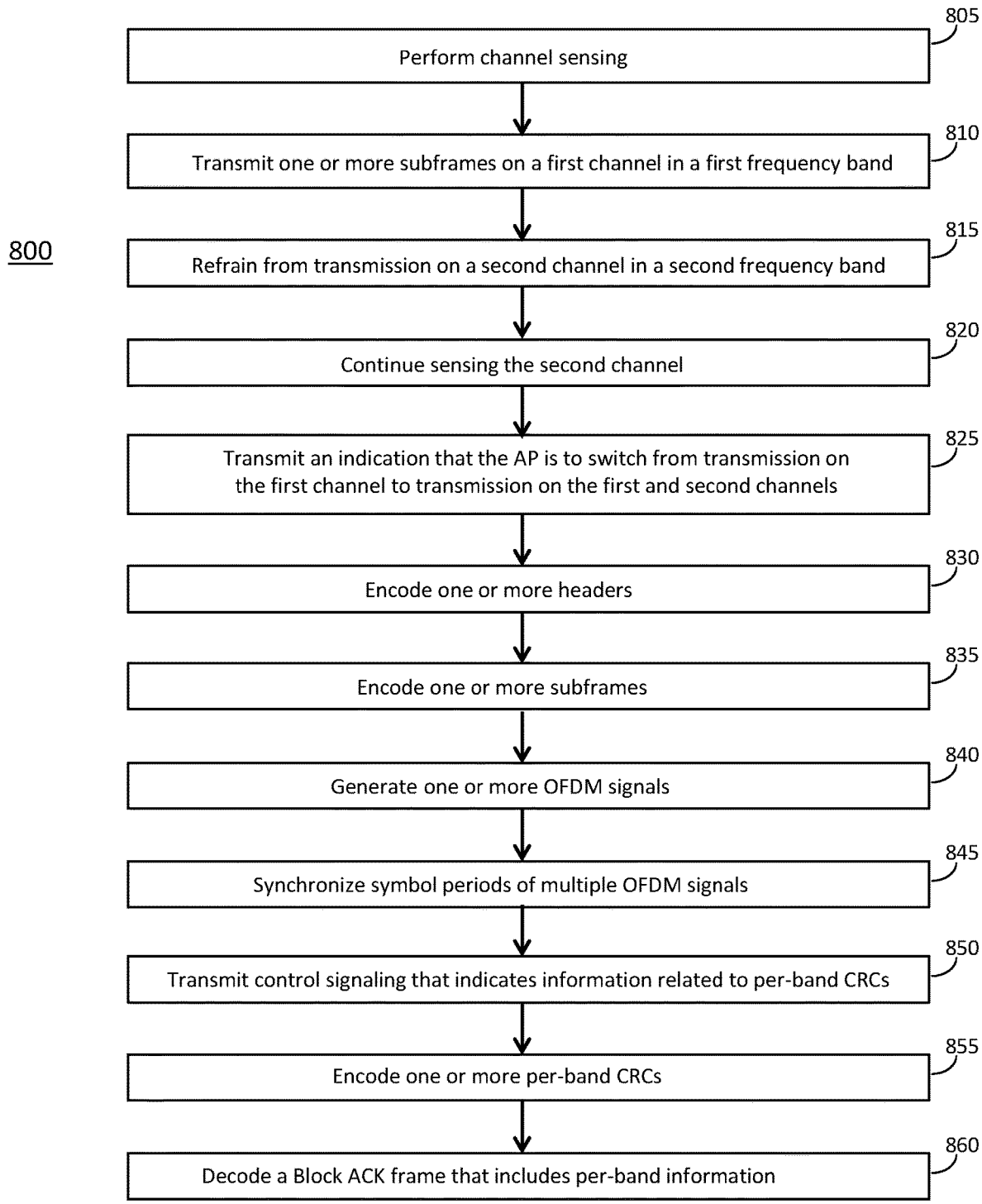
FIG. 8 illustrates the operation of a method in accordance with some embodiments.
Figure 9:
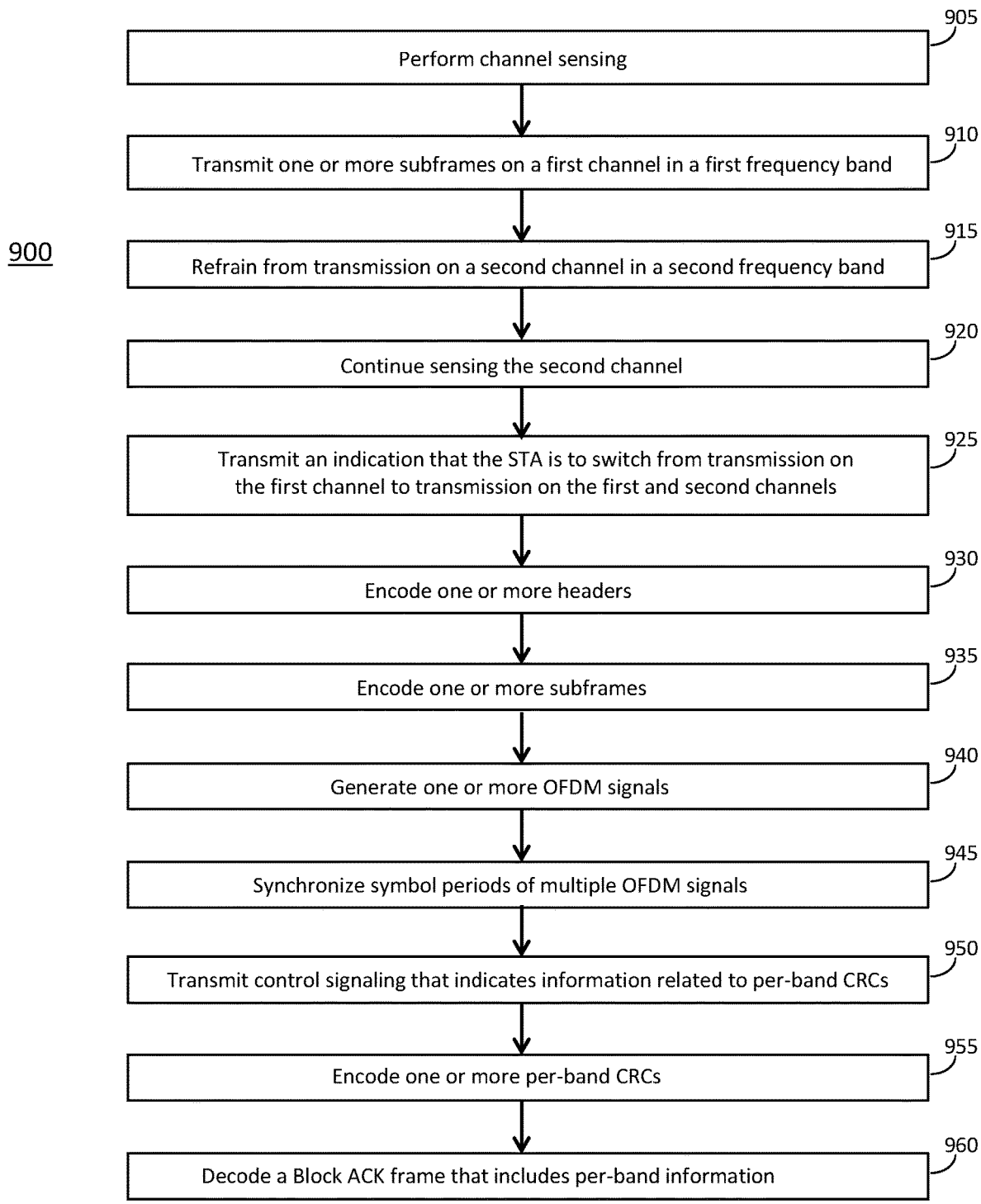
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an AP 502 may perform one or more operations of the method 800, but embodiments are not limited to performance of the method 800 and/or operations of it by the AP 502. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the STA 504 may perform an operation that may be the same as, similar to, reciprocal to and/or related to an operation of the method 800, in some embodiments. In another non-limiting example, the legacy STA 506 may perform an operation that may be the same as, similar to, reciprocal to and/or related to an operation of the method 800, in some embodiments.

In some embodiments, an STA 504 may perform one or more operations of the method 900, but embodiments are not limited to performance of the method 900 and/or operations of it by the STA 504. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the AP 502 may perform an operation that may be the same as, similar to, reciprocal to and/or related to an operation of the method 900, in some embodiments. In another non-limiting example, the legacy STA 506 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by an AP 502, and an operation of the method 900 may include reception of a same element (and/or similar element) by the STA 504.

The method 800 may include operations related to transmission of PPDUs, signals and/or other elements, and the method 900 may include operations related to reception of PPDUs, signals and/or other elements. In some embodiments, a device (such as the AP 502, STA 504, legacy STA 506 and/or other) may be configured to perform operations from both methods 800, 900. For instance, the device may be configured to transmit one or more elements, and may perform one or more operations related to the method 800 to transmit the one or more elements. The device may also be configured to receive one or more other elements from another device, and may perform one or more operations related to the method 900 to receive the one or more other elements.

In some cases, descriptions of operations and techniques described as part of one of the methods 800, 900 may be relevant to the other method. Discussion of various techniques and concepts regarding one of the methods 800, 900 and/or other method may be applicable to one of the other methods, although the scope of embodiments is not limited in this respect.

The methods 800, 900 and other methods described herein may refer to APs 502, STAs 504, legacy STAs 506 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 may also be applicable to an apparatus of an AP 502, an apparatus of an STA 504, an apparatus of a legacy STA 506 and/or an apparatus of another device. In some embodiments, an apparatus of an STA 504 and/or apparatus of an AP 502 may perform one or more operations of the methods 800, 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In addition, embodiments are not limited by references herein (such as in descriptions of the methods 800, 900 and/or other descriptions herein) to generation, encoding, decoding, detection and/or other processing of elements. In some embodiments, such elements may be transmitted, received and/or exchanged.

In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, 802.11p, IEEE 802.11ac, IEEE 802.11ax and/or other. The scope of embodiments is not limited to usage of those elements, however. In some embodiments, different elements, similar elements, alternate elements and/or other elements may be used. The scope of embodiments is also not limited to usage of elements that are included in standards.

In some embodiments, the AP 502 and/or STA 504 may be configured for unlicensed operation, including but not limited to operation in one or more of: a 5 GHz frequency band, a 6 GHz frequency band and/or other frequency band(s).

At operation 805, the AP 502 may perform channel sensing. In some embodiments, the AP 502 may perform channel sensing in a first channel of a first frequency band and a second channel of a second frequency band. In some embodiments, the AP 502 may perform the channel sensing to obtain access for transmission of a physical layer convergence procedure (PLCP) protocol data unit (PPDU). In some embodiments, the transmission of the PPDU may be configurable to use a multi-band layer-1 aggregation of the first and second channels. In some embodiments, the PPDU may comprise multiple subframes.

Embodiments are not limited to cases in which two frequency bands are used, as one or more of the techniques, operations and/or methods described herein may be extended and/or modified for usage in cases in which more than two frequency bands are used. Embodiments are also not limited to usage of a single channel on each frequency band as in some descriptions herein. For instance, a multi-band layer-1 aggregation may include transmission in one or more channels on a first frequency band and transmission in one or more channels on a second frequency band, in some embodiments. The above scenario may also be extended to usage of more than two channels, in some embodiments.

Embodiments are not limited to transmission of a PPDU, as one or more of the techniques, operations and/or methods described herein related to transmission of a PPDU may be applicable to transmission of other packets/elements (like an aggregated medium access control (MAC) protocol data unit (A-MPDU) and/or other). In some embodiments, the AP 502 may aggregate a plurality of MAC protocol data units (MPDUs) to generate the A-MPDU.

Embodiments are also not limited to division of a packet (A-MPDU, PPDU and/or other) into subframes. In some embodiments, the packet may include multiple elements, and the elements may not necessarily be subframes.

At operation 810, the AP 502 may transmit one or more subframes on a first channel in a first frequency band. At operation 815, the AP 502 may refrain from transmission on a second channel in a second frequency band. At operation 820, the AP 502 may continue sensing the second channel. At operation 825, the AP 502 may transmit an indication that the AP 502 is to switch from transmission on the first channel to transmission on the first and second channel.

In some embodiments, the AP 502 may determine, based at least partly on the channel sensing, whether the first channel is available and whether the second channel is available. The AP 502 may perform one or more operations (including but not limited to operations 810-845) based on results of the channel sensing, although the scope of embodiments is not limited in this respect.

In a non-limiting example, it is determined, based on the channel sensing of the first and second channels, that the first channel is available and that the second channel is unavailable, the AP 502 may perform one or more of: A) transmit one or more of the subframes on the first channel without usage of the multi-band layer-1 aggregation while the second channel is unavailable, B) refrain from transmission of the subframes on the second channel while the second channel is unavailable, C) continue sensing the second channel while the second channel is unavailable, D) when it is determined that the second channel has become available, encode a subframe and/or a header of the subframe to indicate a switch, by the AP 502, from transmission of the subframes on the first channel to synchronized transmission of the subframes on the first and second channels in accordance with the multi-band layer-1 aggregation.

In some embodiments, in "C" above, the AP 502 may perform the channel sensing of the second channel concurrently with the transmission of the subframes on the first channel without the multi-band layer-1 aggregation, although the scope of embodiments is not limited in this respect.

In some embodiments, in "D" above, the subframe may be one of the subframes encoded for transmission on the first channel without usage of the multi-band layer-1 aggregation, although the scope of embodiments is not limited in this respect.

In some embodiments, if it is determined, based on the channel sensing of the first and second channels, that the first channel is available and that the second channel is available, the AP 502 may encode the subframes for synchronized transmission of the subframes on the first and second channels in accordance with the multi-band layer-1 aggregation. For instance, if it is determined that both channels are available, the AP 502 may transmit one or more subframes in accordance with the multi-band layer-1 aggregation.

In some embodiments, the AP 502 may transmit, on the second channel, one or more of: a training field, a next generation signal-A (NG-SIG-A) field, a padding portion and/or other. In some embodiments, the AP 502 may transmit the above elements on the second channel in accordance with one or more of the following: A) if it is determined, based on the channel sensing of the first and second channels, that the first channel is available and that the second channel is unavailable, B) when it is determined that the second channel has become available, C) after it is determined that the second channel has become available, and before the switch, and D) other.

In some embodiments, the AP 502 may encode the NG-SIG-A field to indicate whether a pause period is to occur. In a non-limiting example, the pause period may occur after the transmission of the subframes on the first channel, and before the synchronized transmission of subsequent subframes on the first and second channels in accordance with the multi-band layer-1 aggregation.

In some embodiments, the AP 502 may determine a length of the padding portion based at least partly on an end time of a final subframe to be transmitted on the first channel without the multi-band layer-1 aggregation. In some embodiments, the AP 502 may encode the NG-SIG-A field to indicate the length of the padding portion.

In some embodiments, the AP 502 may encode, for synchronized transmission on the first and second channels in accordance with the multi-band layer-1 aggregation, a next generation signal-B (NG-SIG-B) field that indicates one or more of: a bandwidth of the first channel, a bandwidth of the second channel, a modulation and coding scheme (MCS) for the first channel, an MCS for the second channel and/or other. In some embodiments, the AP 502 may encode the NG-SIB-B field for transmission on the first and second channels in accordance with one or more of: A) if it is determined, based on the channel sensing of the first and second channels, that the first channel is available and that the second channel is unavailable, B) when it is determined that the second channel has become available, C) other.

At operation 830, the AP 502 may encode one or more headers. At operation 835, the AP 502 may encode one or more subframes. At operation 840, the AP 502 may generate one or more OFDM signals. At operation 845, the AP 502 may synchronize symbol periods of multiple OFDM signals.

In some embodiments, as part of the synchronized transmission on the first and second channels, the AP 502 may perform one or more of: generate a first orthogonal frequency division multiplexing (OFDM) signal for the first channel; generate a second OFDM signal for the second channel; synchronize starting times of OFDM symbols of the first and second OFDM signals; and/or other operation(s). For instance, the synchronization of the OFDM symbols (starting times and/or other aspects) may be performed as part of a layer-1 aggregation (including but not limited to multi-band layer-1 aggregation).

In some embodiments, for the synchronized transmission on the first and second channels, the AP 502 may perform one or more of: generate encoded bits based on payload bits of one of the subframes; generate the first OFDM signal based at least partly on a first portion of the encoded bits; generate the second OFDM signal based at least partly on a second portion of the encoded bits; and/or other operation(s). In a non-limiting example, bits may be interleaved across the two frequency bands before generation of the OFDM signal. The scope of embodiments is not limited to this example, however, as any suitable operation(s) (including but not limited to encoding, interleaving, bit-to-symbol mapping and/or other(s)) may be used to generate the first and second OFDM signals based on bits (including but not limited to payload bits of one or more subframes).

In a non-limiting example: the plurality of subframes may be a sequence of subframes; the subframes encoded for transmission on the first channel without the multi-band layer-1 aggregation may be a first sub-sequence; the subframe for which the header is encoded to indicate the switch by the AP 502 may be a final subframe of the first sub-sequence; the AP 502 may transmit a second sub-sequence of the subframes in accordance with a synchronized transmission on the first and second channels; and/or other. In some embodiments, the second sub-sequence may include the subframes of the sequence that are not included in the first sub-sequence.

In some embodiments, the first and second frequency bands may be in a range of 5 GHz and/or a range of 6 GHz. In a non-limiting example, in some of the cases/scenarios described herein: the first frequency band may be in a range of 5 GHz and the second frequency band may be in a range of 6 GHz; or the first frequency band may be in a range of 6 GHz and the second frequency band may be in a range of 5 GHz.

At operation 850, the AP 502 may transmit control signaling that indicates information related to per-band CRCs. At operation 855, the AP 502 may encode one or more per-band CRCs. At operation 860, the AP 502 may decode a Block ACK frame that includes per-band information.

It should be noted that in some embodiments, the method 800 may not necessarily include all operations shown in FIG. 8. In a non-limiting example, the method 800 may include one or more of operations 805-845, but may not necessarily include one or more of operations 850-860.

In some embodiments, the AP 502 may perform channel sensing in a first channel of a first frequency band and a second channel of a second frequency band to obtain access for transmission of a PPDU. The transmission of the PPDU may be configurable to use a multi-band layer-1 aggregation of the first and second channels. The PPDU may comprise multiple subframes. The AP 502 may encode the subframes for synchronized transmission on the first and second channels in accordance with the multi-band layer-1 aggregation. The AP 502 may, for one of the subframes, perform one or more of: A) generate a first OFDM signal for the first channel based on one or more of: a first plurality of bits, a first per-band CRC for the first channel (wherein the first per-band CRC may be based on the first plurality of bits) and/or other, B) generate a second OFDM signal for the second channel based on one or more of: a second plurality of bits, a second per-band CRC for the second channel (wherein the second per-band CRC may be based on the second plurality of bits) and/or other, and C) other.

In some embodiments, the AP 502 may encode one or more high efficiency (HE) headers to indicate one or more of: whether the subframes are encoded to include per-band CRCs; a periodicity of the per-band CRCs in terms of a number of subframes; and/or other. Embodiments are not limited to usage of HE headers, as another header and/or another element may be used, in some embodiments.

In some embodiments, the AP 502 may, for multiple subsets of the subframes, for each of the subsets: generate a first per-band CRC for the subframes of the subset; generate a second per-band CRC for the subframes of the subset; and/or other.

In some embodiments, the AP 502 may generate per-band CRCs based on multiple subframes. In a non-limiting example, the AP 502 may generate a pair of per-band CRCs (one for the first channel and one for the second channel) based on multiple subframes. For instance, with a periodicity of "N," the per-band CRCs may be generated every Nth subframe, in some embodiments.

In some embodiments, the AP 502 may decode a block acknowledgement (BA) frame that indicates, for each of the subframes of the PPDU, one or more of: whether the subframe was successfully decoded; for each of the first and second channels, results related to a CRC check of the corresponding per-band CRC; and/or other.

In some embodiments, an apparatus of an AP 502 may comprise memory. The memory may be configurable to store at least a portion of a PPDU. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the PPDU. The apparatus may include a transceiver to transmit the PPDU. The transceiver may transmit and/or receive other blocks, messages and/or other elements.

At operation 905, the STA 504 may perform channel sensing. At operation 910, the STA 504 may transmit one or more subframes on a first channel in a first frequency band. At operation 915, the STA 504 may refrain from transmission on a second channel in a second frequency band. At operation 920, the STA 504 may continue sensing the second channel. At operation 925, the STA 504 may transmit an indication that the STA 504 is to switch from transmission on the first channel to transmission on the first and second channel. At operation 930, the STA 504 may encode one or more headers. At operation 935, the STA 504 may encode one or more subframes. At operation 940, the STA 504 may generate one or more OFDM signals. At operation 945, the STA 504 may synchronize symbol periods of multiple OFDM signals.

In some embodiments, the STA 504 may, during a first period before transmission of a PPDU in accordance with a multi-band layer-1 aggregation of a first channel in a first frequency band and a second channel in a second frequency band (wherein the PPDU may comprise a plurality of subframes), perform one or more of: sense the first channel to determine if the first channel is available; sense the second channel to determine if the second channel is available; and/or other.

In some embodiments, the STA 504 may, if it is determined in the first period that the first channel is available and that the second channel is unavailable, during a second period after the first period, perform one or more of: encode a first subset of the subframes of the PPDU for transmission on the first channel without usage of the multi-band layer-1 aggregation; refrain from transmission of the subframes on the second channel; sense the second channel until it is determined that the second channel has become available; when it is determined that the second channel has become available, encode a header of one of the subframes of the first subset to indicate that, during a third period after the second period, the STA 504 is to transmit a second subset of the subframes of the PPDU on the first and second channels in accordance with the multi-band layer-1 aggregation; and/or other.

In some embodiments, the STA 504 may, during the third period, as part of the multi-band layer-1 aggregation, perform one or more of: generate OFDM signals for transmission on the first and second channels; synchronize starting OFDM symbol periods of the OFDM signals for the transmission on the first and second channels; and/or other.

At operation 950, the STA 504 may transmit control signaling that indicates information related to per-band CRCs. At operation 955, the STA 504 may encode one or more per-band CRCs. At operation 960, the STA 504 may decode a Block ACK frame that includes per-band information.

It should be noted that in some embodiments, the method 900 may not necessarily include all operations shown in FIG. 9. In a non-limiting example, the method 900 may include one or more of operations 905-945, but may not necessarily include one or more of operations 950-960.

In some embodiments, an apparatus of an STA 504 may comprise memory. The memory may be configurable to store at least a portion of a PPDU. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to encoding of the PPDU. The apparatus may include a transceiver to transmit the PPDU. The transceiver may transmit and/or receive other blocks, messages and/or other elements.

Figure 10:
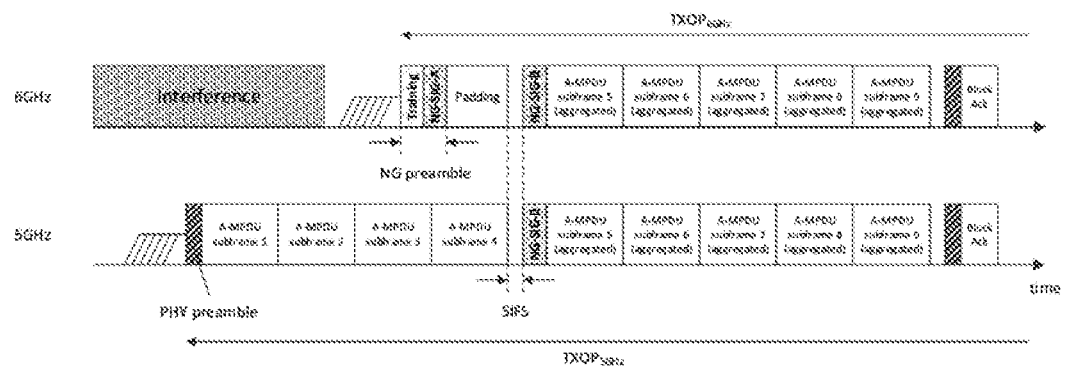
FIG. 10 illustrates example multi-band aggregated channel access behavior in accordance with some embodiments.
Figure 11:
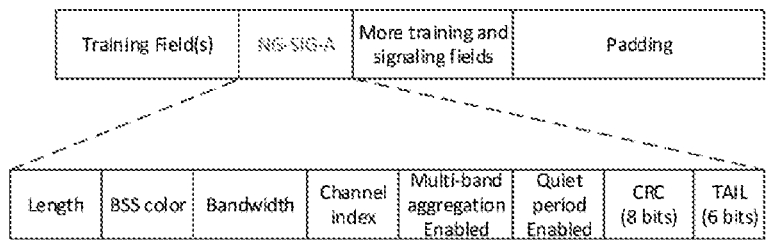
FIG. 11 illustrates an example field in accordance with some embodiments.
Figure 12:
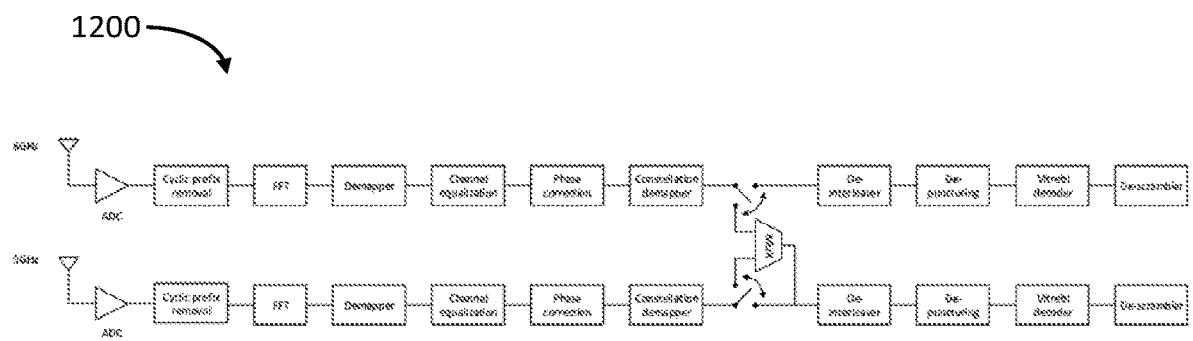
FIG. 12 illustrates an example receiver PHY baseband architecture for multi-band-aggregated packet processing in accordance with some embodiments.
Figure 13:
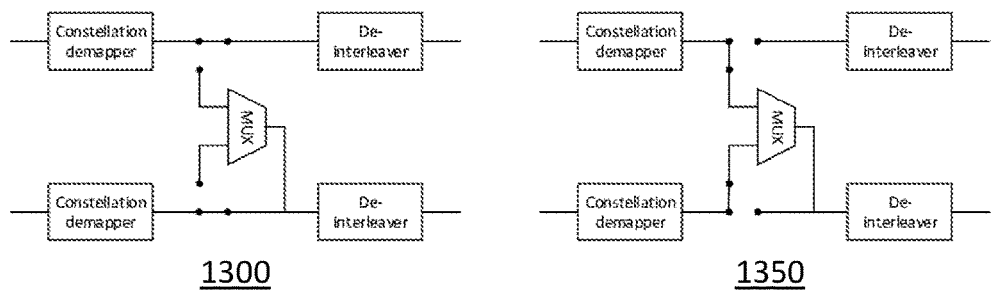
FIG. 13 illustrates an example receiver chain configuration for multi-band-aggregated packet processing in accordance with some embodiments.
Figure 14:
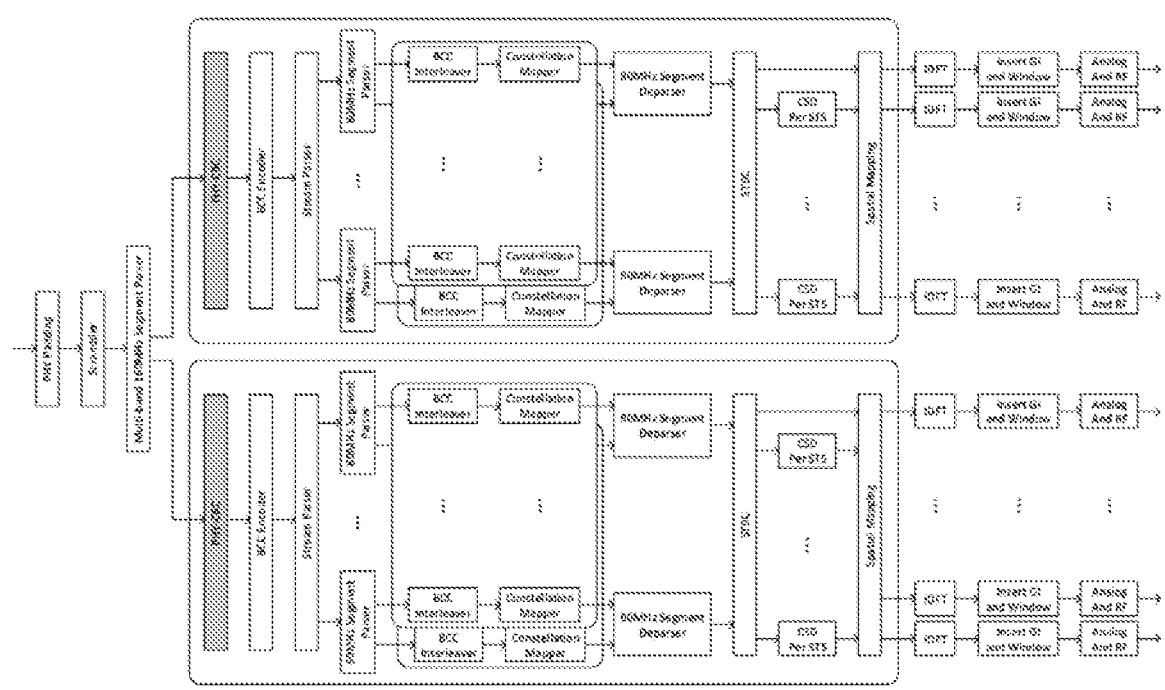
FIG. 14 illustrates an example transmit PHY diagram in accordance with some embodiments.
Figure 15:
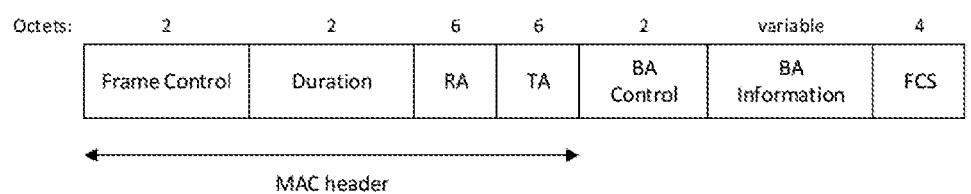
FIG. 15 illustrates an example Block Acknowledgement frame in accordance with some embodiments.
Figure 16:
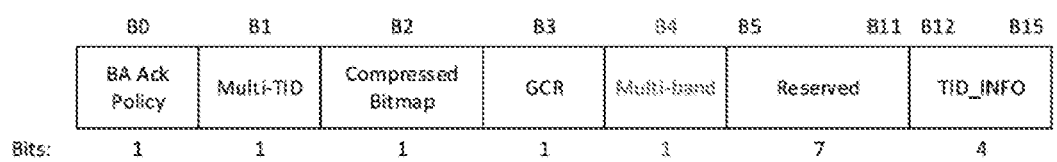
FIG. 16 illustrates an example control field in accordance with some embodiments.
Figure 17:
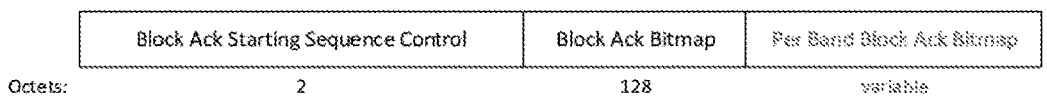
FIG. 17 illustrates an example information field in accordance with some embodiments.
Figure 18:
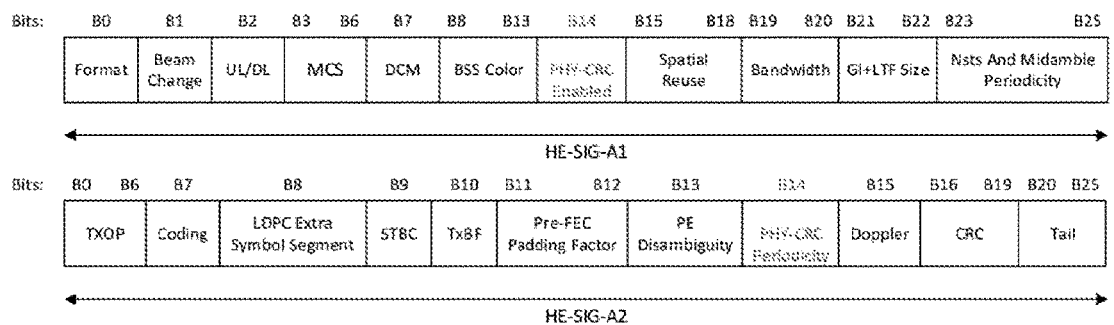
FIG. 18 illustrates example signaling in accordance with some embodiments.
Figure 19:
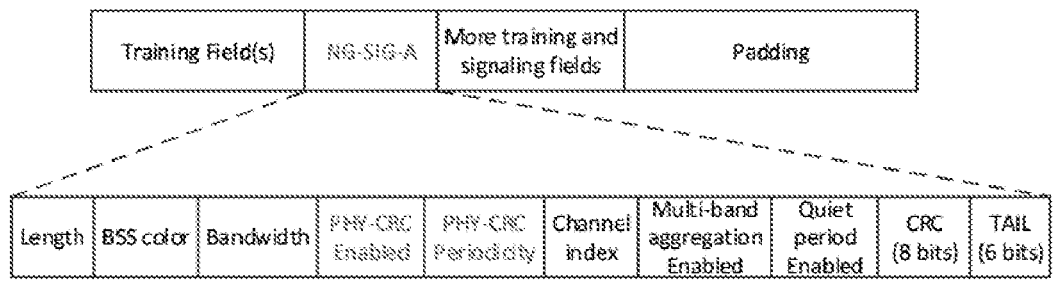
FIG. 19 illustrates example signaling in accordance with some embodiments.

FIG. 10 illustrates example multi-band aggregated channel access behavior in accordance with some embodiments. FIG. 11 illustrates an example field in accordance with some embodiments. FIG. 12 illustrates an example receiver PHY baseband architecture for multi-band-aggregated packet processing in accordance with some embodiments. FIG. 13 illustrates an example receiver chain configuration for multi-band-aggregated packet processing in accordance with some embodiments. FIG. 14 illustrates an example transmit PHY diagram in accordance with some embodiments. FIG. 15 illustrates an example Block Acknowledgement frame in accordance with some embodiments. FIG. 16 illustrates an example control field in accordance with some embodiments. FIG. 17 illustrates an example information field in accordance with some embodiments. FIG. 18 illustrates example signaling in accordance with some embodiments. FIG. 19 illustrates example signaling in accordance with some embodiments.

It should be noted that the examples shown in FIGS. 10-19 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-19. Although some of the elements shown in the examples of FIGS. 10-19 may be included in a WLAN standard, Wi-Fi standard, 802.11 standard, 802.11ac standard, 802.11ax standard and/or other standard, embodiments are not limited to usage of such elements that are included in standards.

In some embodiments, methods for dynamic multi-band aggregation may be used. Such methods may be applicable to next-gen Wi-Fi, although the scope of embodiments is not limited in this respect.

In the next-gen Wi-Fi systems, 802.11 devices (e.g., Wi-Fi AP/STA) may operate on multiple wireless frequency bands simultaneously, e.g., 2.4 GHz, 5 GHz and new bands on 6-7 GHz. It is possible that next-gen Wi-Fi devices will be able to operate on multiple bands concurrently to achieve higher throughput performance. Channel aggregation between two channels in two different bands will be a key enabling feature for next-gen Wi-Fi systems, e.g., the aggregation of a channel at 5 GHz and a channel at 6 GHz (or it can be a combination of any bands including 2.4 GHz). There are at least two solution approaches: (i) layer-1 aggregation, and (ii) layer-2 aggregation.

Some embodiments herein may be related to methods for layer-1 aggregation which is effectively an extension of the current 802.11 channel bonding mechanism to multi-band. The current channel bonding schemes suffer from the low probability of accessing the channel/band in the presence of OBSS (Overlapping Basic Service Set) signals due to the current design—i.e., the channel bandwidth must be determined at the beginning of the PPDU transmission and the channel bandwidth cannot be changed during PPDU transmission. This can be also problematic in multi-band aggregation because channels in different bands are not likely to be available at the same time.

Some embodiments described herein may be related to dynamic multi-band channel bonding wherein a transmitter (e.g., Wi-Fi AP) starts a PPDU (PLCP protocol data unit) transmission on one band (e.g., 5 GHz), and upon detection that a new channel becomes available (e.g., 6 GHz), it does a controlled early termination of the on-going PPDU transmission in the current band and starts a new PPDU transmission across the two (or multiple) bands (e.g., both 5 and 6 GHz).

It should be noted that some embodiments described herein may be related to use cases in which a transmitter uses multi-band aggregation for a single user downlink PPDU transmission. Embodiments are not limited to downlink transmission, however. One or more of the techniques, operations and/or methods described herein may be used for uplink transmission, in some embodiments.

In some embodiments, layer-1 multi-band aggregation may begin in the middle of on-going PPDU transmissions. Such dynamic multi-band aggregation capability is very important in next-gen WiFi systems because the channel availability across multiple-bands will be asynchronous and the current way of determining the channel bandwidth only at the beginning of the PPDU transmission would not be sufficient. In some cases, a lack of ability to support multi-band-aggregated PPDU transmission may prevent next-gen Wi-Fi devices from fully utilizing multiple available bands and its capability to concurrently operate on multiple bands.

Some embodiments may be related to enablement of dynamic layer-1 multi-band channel bonding (or aggregation) so that a transmitter (e.g., Wi-Fi AP) can fully utilize all the available resources. For multi-band channel bonding, the transmitter can continuously monitor channels on other bands, say 6 GHz, while transmitting a PPDU on the current band, say 5 GHz. Once the transmitter detects a channel(s) become available on another (or secondary) band, it performs CSMA/CA to gain access to the channel(s), and start transmitting a PPDU over multiple bands to boost the throughput performance and reduce latency. For layer-1 aggregation, the transmitter aligns the timing of the transmissions over two different bands by introducing additional padding in the PSDU, as will be described in more detail later.

In some cases, one or more of the techniques, operations and/or methods described herein may enable next-gen Wi-Fi devices equipped with multi-band radios to fully utilize the available resources (channels) across multiple bands. It does not require major HW/SW changes to enable asynchronous multi-band aggregation, which is different from enabling asynchronous channel bonding within the same band (requiring self-interference cancellation technology). With the proposed layer-1 aggregation, Wi-Fi devices can achieve higher throughput and lower latency performance.

In some embodiments, the receiver can operate on multiple bands concurrently. For example, it may be assumed, in some cases, that the receiver has at least two antennas where at least one antenna is connected to a separate RX chain tuned in each of the different band of interest, e.g., 5 GHz and 6 GHz. For multi-band aggregation, it may be assumed, in some cases, that the RX chains can forward the received bit samples to another RX chain to de-interleave and/or decode them together.

FIG. 10 illustrates example multi-band aggregated channel access behavior. In FIG. 10, the transmitter starts transmitting a PPDU on one band, e.g., 5 GHz, because the channel(s) on 6 GHz band is not available at the moment. While transmitting the PPDU on 5 GHz band, it continues to monitor/sense channel(s) on another band, e.g., 6 GHz. If the transmitter detects a channel(s) on the 6 GHz becomes available, it contends for the channel using the standard 802.11 CSMA/CA procedure.

Embodiments are not limited to the frequency bands shown in FIG. 10. Embodiments are also not limited to the number of frequency bands shown (two), as one or more of the techniques, operations and/or methods described herein may be extended and/or modified for usage in cases in which more than two frequency bands are used.

Embodiments are also not limited to the case shown in FIG. 10. For instance, in another case, the 5 GHz band may not be available in the beginning of transmission of the PPDU, and the transmitter may transmit one or more subframes on the 6 GHz band until the 5 GHz band becomes available. The transmitter may then transmit simultaneously on both the 5 GHz and 6 GHz band.

In addition, although FIG. 10 illustrates transmission of an "A-MPDU" that includes multiple A-MPDU subframes, embodiments are not limited to usage of an A-MPDU. One or more of the concepts, techniques, operations and/or methods illustrated by FIG. 10 may be applicable to transmission of other packets (like a PPDU and/or other), in some embodiments. In addition, embodiments are also not limited to transmission of a PPDU, as one or more of the techniques, operations and/or methods described herein related to transmission of a PPDU may be applicable to transmission of other packets (like an A-MPDU and/or other). Embodiments are also not limited to division of a packet (A-MPDU, PPDU and/or other) into subframes. In some embodiments, the packet may include multiple elements, and the elements may not necessarily be subframes.

In some embodiments, for each PPDU transmission, the multi-band aggregation decision module in the transmitter has to decide (i) whether to enable/attempt multi-band aggregation, and (ii) if yes, upon detection of new available channel/band, whether it wants to initiate multi-band-aggregated PPDU transmission, as shown in FIG. 10. These decisions will be made based on multiple factors, including PPDU length, channel condition, TXOP, BSS load, channel access statistics from previous transmissions, and/or other(s). Such multi-band aggregation indication information (multi-band enabled/disabled) can be conveyed as part of the PHY preamble at the beginning of the PPDU transmission. Based on such indication, the receiver can put RX chain components into low power states to save power (if appropriate).

In some embodiments, referring back to the example in FIG. 10, once the transmitter wins the channel access right on 6 GHz, then it transmits a PPDU which may include one or more of the following: A) training field(s) for signal detection, AGC (automatic gain control), channel estimation, timing/frequency synchronization, etc.; B) signaling field (denoted as NG-SIG-A) which indicates information that may include one or more of the following subfields (and/or other(s)): length (for 6 GHz band); BSS color (for 6 GHz band); bandwidths & channel indexes (for both 5 and 6 GHz bands); MCSes (for aggregated PPDU transmission, it may use different MCS on each band); indication of multi-band aggregation (1-bit); indication of the pause (quite period) after the padding (optional, 1-bit); CRC; tail bits (for convolutional coding); and/or other, C) padding, including but not limited to padding until the end of current A-MPDU subframe transmission on 5 GHz band, as shown in FIG. 10.

FIG. 11 illustrates an example NG-SIG-A field. In some embodiments, the above information conveyed in NG-SIG-A will be received at the receiver on the 6 GHz RX chain and communicated with the RX chain on 5 GHz band so that it can prepare the RX chains to process aggregated PPDU transmitted over both bands. For example, the RX PHY state machine operating on 6 GHz can update a global shared register(s) in the baseband to indicate that it received a PPDU (including NG-SIG-A) for multi-band aggregation. Both RX chains on 5 and 6 GHz bands stop processing incoming OFDM symbols (or RF samples) after the end of the Padding on 6 GHz (which should be aligned with the end of A-MPDU subframe 4 on 5 GHz band). Note that based on the NG-SIG-A, $3^{rd}$ party STAs on 6 GHz band will estimate the transmission time of the PPDU transmission (or TXOP) and set NAV (Network Allocation Vector) accordingly to properly defer their transmissions.

In some embodiments, while sending a new PPDU on 6 GHz band, the transmitter also indicates the multi-band PPDU transmission on the on-going 5 GHz PPDU transmission. For example, in FIG. 10, the transmitter indicates in the MPDU delimiter of the $4^{th}$ A-MPDU frame that it is the last A-MPDU-subframe before the pause followed by a new multi-band-aggregated PPDU transmission.

Alternatively, the transmitter can also send the signaling field (NG-SIG-A) in the current operating channel/band to achieve higher reliability (e.g., via frequency diversity) and latency at the cost of additional overhead.

In some embodiments, at the end of the $4^{th}$ A-MPDU subframe on 5 GHz band, there could be a short period of pause (e.g., several microsecond) for the transmitter and receiver to re-configure the TX/RX chains to process the multi-band-aggregated PPDU. Note that depending on transmission parameters (e.g., total bandwidth, MCS, etc.), hardware capabilities and requirements in terms of processing delay at the transmitter and receiver, the quiet period after the padding may or may not be needed. If the quiet period is needed, the transmitter will indicate that in the NG-SIG-A signaling field.

In some embodiments, additionally, it is possible that the quiet period is actually "quiet", but instead the transmitter continues to send dummy (padding) bits. These will be ignored later by the receiver which will be detecting the NG-SIG-B. Transmitting padding bits provides a few advantages, one it keeps the media busy with a transmission so that devices which missed the preamble, or came out of a sleep mode, would not detect the media as idle for any period of time. Even with short periods of idle (no transmission) could bias the energy detection logic enough to cause other devices to potentially start a transmission. Second, it keeps the currently active receiver (5 GHz one in this case) fully locked to the received signal. Thus, there is no changes to any parameter estimates/tracking such as for AGC, time/frequency tracking.

In some embodiments, at the end of the pause (if present), the transmitter resumes the PPDU transmission on both 5 GHz and 6 GHz bands. The multi-band-aggregated PPDU may include one or more of: A) signaling field (optional, denoted as NG-SIG-B) which may include one or more of the following subfields (and/or others): length (for both 5 and 6 GHz); BSS color(s) (for both 5 and 6 GHz); bandwidths & channel indexes (for both 5 and 6 GHz); MCSes (for both 5 and 6 GHz); and/or other (it should be noted that depending on implementation and protocol design, NG-SIG-B field may not be needed (or skipped) if NG-SIG-A can convey all the information needed for the receiver to process the aggregated PPDU, and B) multi-band PPDU wherein each OFDM symbol is transmitted and received over multiple bands.

In some embodiments, a receiver may receive a multi-band PPDU over two different bands using two separate antennas. As shown in FIG. 12, each RX chain processes the received RF samples to restore transmitted IQ constellations in IQ processing modules including cyclic prefix removal, FFT, de-mapper (based on bandwidth, data/pilot tone allocation, etc.), channel equalization, phase correction, etc. The restored IQ samples will go through the constellation de-mapper and then converted into soft bits. Then, RX chain will re-direct the soft bit stream to a single RX chain to multiplex the two input bit streams and process them together including de-interleaving, de-puncturing, decoding, and de-scrambling to produce bytes for the MAC processing.

In some embodiments, the OFDM symbols in multi-band-aggregated PPDU are inter-leaved over multiple bands to achieve frequency diversity gain. For this, the transmitter has to interleave the scrambled and encoded bits before split them to separate TX IQ processing modules for mapping them to different bands and perform IFFT.

FIG. 12 illustrates an example receiver PHY baseband architecture for multi-band-aggregated PPDU processing. FIG. 13 illustrates an example receiver RX chain configuration for multi-band-aggregated PPDU processing with interleaved bits across the bands. FIG. 13 illustrates receiver PHY receive chain configuration for: (1300) processing on two separate band, and (1350) multi-band-aggregated PPDU processing. It should be noted that the proposed layer-1 multi-band aggregation may be transparent to the MAC-layer and may not necessarily require any modifications in the MAC or above layers.

In some embodiments, methods of enhanced Block Acknowledgement for PHY-layer multi-band-aggregated PPDU transmissions for next-gen Wi-Fi may be used. FIG.

10 shows an example of multi-band-aggregated PPDU where the PPDU is transmitted across 5 GHz and 6 GHz bands. In some embodiments, for layer-1 multi-band-aggregated PPDU transmission, the transmitter may use different transmission configurations (e.g., channel bandwidth, transmit power, MCS, etc.) on each band depending on band-specific channel condition, amount of interference, etc. As a result, the receiver might be able to correctly decode most of the bits transmitted over a certain frequency band (e.g., 5 GHz), while the bits transmitted over another band (e.g., 6 GHz) is corrupted/un-decodable due to interference. Such a decoding failure on a specific band may result in a failure of the entire multi-band aggregated PPDU decoding/reception. This can be one of the main disadvantages of layer-1 multi-band aggregation and therefore requires an efficient PHY/MAC mechanism to address this issue and fully benefit from layer-1 aggregation.

In some embodiments, to address this problem, the receiver should be able to (i) accurately detect the decodability of the bits transmitted over different frequency bands, and (ii) indicate/feedback such information to the transmitter in the acknowledgement (e.g., BlockAck) so that the transmitter can correctly adjust its transmission configurations on each band for the subsequent PPDU (re-) transmissions.

One or more of the techniques, operations and/or methods described herein may enable the receiver to detect the decodability of the bits transmitted on each band using PHY-level CRC and indicate such band-specific decoding results in "multi-band" Block Ack frame. Such multi-band BlockAck protocol will enable more accurate multi-band link adaptation and efficient use of available spectrums.

As mentioned above, with a current frequency-band-agnostic BlockAck protocol, it may be difficult for the transmitter to accurately identify when errors occur in a particular transmission based on the selected transmission parameters and adjust transmission parameters accordingly. As a result, the transmitter may need to adjust transmission configurations (e.g., lowering MCS) for all the bands used in multi-band aggregation at the cost of reduced system efficiency and performance.

One or more of the techniques, operations and/or methods described herein may enable a receiver to provide BlockAck bitmap for each band (e.g., separate bitmap for 5 GHz and 6 GHz) to the transmitter so that the transmitter knows (i) which band was more erroneous and/or cause the decoding failure when errors might have occurred (depending on the detection approach outlined below), and which band or bands they occurred on and (ii) how to adjust its transmission configurations on each band for the next PPDU (A-MPDU) transmission. For example, the receiver evaluates the decodability of the received PPDU on each band based on PHY-level CRC check (our proposal), or any other PHY indicators, such as SNR, RSSI, etc., and sends band-specific BlockAck bitmap to the transmitter.

In some embodiments, based on the band-specific Block-Ack bitmap information from the receiver, the transmitter can adjust transmit configurations for re-transmission, making multi-band-aggregated PPDU (re-)transmission more efficient.

In one or more of the techniques, operations and/or methods described herein, addition of PHY-level CRC information for the bits transmitted over each frequency band (e.g., 5 GHz and 6 GHz). Based on PHY-CRC on each band, the receiver can detect the decoding failure/success of the bits transmitted over each band, the relative level of performance per band, and feedback such information to the transmitter as a part of the proposed multi-band BlockAck frame. It should be noted that one or more of the techniques, operations and/or methods described herein may focus on having a "per band" CRC, but embodiments are not limited to usage of a CRC. Other metrics could be computed and used, such as SINR or other PHY signal quality metrics.

In some embodiments, in order to add PHY-CRC information, the transmitter calculates two separate CRC over the transmitted bits on each band after a "Multi-band 160 MHz Segment Parser" which splits the scrambled bits into two streams based on band-specific transmission configurations, as shown in FIG. 14. FIG. 14 illustrates an example transmit PHY diagram for the Data Field of a multi-band PPDU with PHY-level CRC. The CRC value can be appended at the end of the scrambled bits on each band and transmitted using MCS configured on each band.

For example, if the 5 GHz portion of the multi-band aggregated PPDU was determined to be in error due to interference from other STAs (or too aggressive MCS selection), then the PHY-CRC check on bits transmitted on 5 GHz band may fail at the receiver while PHY-CRC check on 6 GHz may pass. In this case, if the receiver fails to decode the entire multi-band PPDU, then it knows that the failure is highly likely due to the decoding failure on 5 GHz band. Therefore, such band-specific PHY-level CRC information allows the receiver to provide/feedback more detailed information/guidance to the transmitter for adjusting per-band transmission configurations.

In some embodiments, the transmitter can insert PHY-CRC information for each A-MPDU subframe if there are multiple A-MPDU subframes in PPDU. Alternatively, the transmitter can also insert PHY-CRC once every N OFDM symbols. The frequency of the PHY-CRC information can be indicated in the PHY preamble (see FIG. 18).

In some embodiments, the PHY-level CRC information can be optional and omitted if adding CRC value would cost an extra OFDM symbol. Such boundary conditions can be checked in advance based on the number of data bits to transmit, MCS, # of OFDM subcarriers on each band, etc., and the presence/absence of PHY-CRC information can be indicated in PHY preamble (e.g., signaling field, see FIG. 18). An alternative method in the absence of PHY-level CRC to determine the relative performance per-band is to utilize the RSSI measurements from the L-STF field of the preamble received on each of the bands. The receiver can compare the RSSI measurement with a threshold value (depending on MCS used) to determine which of the bands experiences a drop in the RSSI and therefore causing large packet errors.

In some embodiments, when PHY-CRC is enabled for multi-band aggregated PPDU transmission, the receiver will check the PHY-CRC on each band separately per-PPDU (in case of BCC) or once every N-codeword (in case of LDPC), and prepares multi-band PHY BlockAck bitmap information as a part of the BlockAck frame.

FIG. 15 illustrates an example BlockAck frame format.

In some embodiments, multi-band BlockAck frame can be indicated in the CA Control field by repurposing one of the "Reserved" field in the BA Control field, as shown in FIG. 16. The receiver will set the value of the "Multi-band (B4)" subfield of the BA Control field to indicate that the BlockAck frame is a proposed "Multi-band BlockAck" variant.

FIG. 16 illustrates an example BA Control field. In some embodiments, for the "Multi-band BlockAck" variant, the receiver will send both the basic BlockAck information for the entire multi-band aggregated PPDU, as well as additional per-band BlockAck bitmap information as shown in FIG. 5. The size of the per-band BlockAck bitmap depends on the number of PHY-CRCs inserted in the PPDU (e.g., per A-MPDU subframe, per 20 OFDM symbols, etc.).

In some embodiments, in addition to the PHY-CRC-based bitmap information, the receiver can also indicate other PHY-layer indicators in the BA Information field, such as average SNR (or SINR, or other signal quality measure) per band, which can be used by the transmitter in adjusting per-band transmission parameters, e.g., MCS.

FIG. 17 illustrates an example BA Information field for Multi-band BlockAck variant. In some embodiments, the Multi-band BlockAck frame can be transmitted over only the narrower primary 20 MHz of each frequency band instead of the entire channel bandwidth (e.g., 160 or 320 MHz) to improve the decodability of the BlockAck frame.

Alternatively, the receiver can estimate the signal strength on each of the links based on PHY preamble (e.g., L-LTF) and sends a single BlockAck only on the band with a higher RSSI measurement. The receiver can use the "Multi-band" bit in FIG. 4 to indicate that the current BlockAck variant is a response to a multi-band data transmission. Instead of the "per-band Block ACK bitmap", the receiver can send the regular Block Ack bitmap once but also indicating the link condition information such as the average SNR per band.

In some embodiments, the transmitter can indicate the presence/absence of PHY-CRC information for multi-based aggregated PPDU transmissions. FIG. 18 shows an example of PHY-CRC signaling by: A) repurposing the 1-bit "Reserved (B14)" in HE-SIG-A1 for "PHY-CRC Enabled" indication; when PHY-CRC is used, this bit is set to "1 (Enabled)"; otherwise, set to "0 (Disabled)", and B) repurposing the 1-bit "Reserved (B14)" in HE-SIG-A2 for "PHY-CRC Periodicity" indication; for example, when this bit is set to "0", PHY-CRC is inserted at the end of each A-MPDU subframe; or when set to "1", PHY-CRC is inserted once every, e.g., 20 OFDM symbols.

FIG. 18 illustrates example PHY signaling for PHY-CRC indication in 802.11ax HE-SIG-A. Note that FIG. 18 is just one example of indicating PHY-CRC based on 802.11ax PHY preamble format. The proposed layer-1 multi-band aggregation and multi-band BlockAck mechanism will likely be introduced in next-gen Wi-Fi standards. FIG. 19 shows another example of indication of PHY-CRC based on the NG-SIG-A signaling field.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising: memory; and processing circuitry, configured to:
   perform channel sensing in a first channel of a first frequency band and a second channel of a second frequency band to obtain access for transmission of a physical layer convergence procedure (PLCP) protocol data unit (PPDU), the transmission of the PPDU configurable to use a multi-band layer-1 aggregation of the first and second channels, the PPDU comprising multiple subframes;
   if it is determined, based on the channel sensing of the first and second channels, that the first channel is available and that the second channel is unavailable:
   encode one or more of the subframes for transmission on the first channel without usage of the multi-band layer-1 aggregation while the second channel is unavailable;
   refrain from transmission of the subframes on the second channel while the second channel is unavailable;
   when it is determined that the second channel has become available, encode a header of one of the subframes transmitted on the first channel to indicate:
   a switch, by the AP, from transmission of the subframes on the first channel without multi-band layer-1 aggregation, to synchronized transmission of subframes on the first and second channels in accordance with the multi-band layer-1 aggregation,
   wherein as part of the synchronized transmission on the first and second channels, the processing circuitry is configured to:
   generate a first orthogonal frequency division multiplexing (OFDM) signal for the first channel;
   generate a second OFDM signal for the second channel; and
   synchronize starting times of OFDM symbols of the first and second OFDM signals.

2. The apparatus according to claim 1, the processing circuitry further configured to:
   for the synchronized transmission on the first and second channels:
   generate encoded bits based on payload bits of one of the subframes;
   generate the first OFDM signal based at least partly on a first portion of the encoded bits; and
   generate the second OFDM signal based at least partly on a second portion of the encoded bits.

3. The apparatus according to claim 1, the processing circuitry further configured to:
   if it is determined, based on the channel sensing of the first and second channels, that the first channel is available and that the second channel is available:
   encode the subframes for synchronized transmission of the subframes on the first and second channels in accordance with the multi-band layer-1 aggregation.

4. The apparatus according to claim 1, the processing circuitry further configured to:
   if it is determined, based on the channel sensing of the first and second channels, that the first channel is available and that the second channel is unavailable:
   perform channel sensing of the second channel concurrently with the transmission of the subframes on the first channel.

5. The apparatus according to claim 1, the processing circuitry further configured to:
   after it is determined that the second channel has become available, and before the switch:
   encode, for transmission on the second channel:
   a training field,
   a next generation signal-A (NG-SIG-A) field, and
   a padding portion.

6. The apparatus according to claim 5, the processing circuitry further configured to:
   encode the NG-SIG-A field to indicate whether a pause period is to occur, wherein the pause period is:
   after the transmission of the subframes on the first channel, and
   before the synchronized transmission of subsequent subframes on the first and second channels in accordance with the multi-band layer-1 aggregation.

7. The apparatus according to claim 5, the processing circuitry further configured to:
   determine a length of the padding portion based at least partly on an end time of a final subframe to be transmitted on the first channel without the multi-band layer-1 aggregation; and
   encode the NG-SIG-A field to indicate the length of the padding portion.

8. The apparatus according to claim 1, the processing circuitry further configured to:
   if it is determined, based on the channel sensing of the first and second channels, that the first channel is available and that the second channel is unavailable, when it is determined that the second channel has become available:
   encode, for synchronized transmission on the first and second channels in accordance with the multi-band layer-1 aggregation, a next generation signal-B (NG-SIG-B) field that indicates one or more of:
   a bandwidth of the first channel,
   a bandwidth of the second channel,
   a modulation and coding scheme (MCS) for the first channel, and
   an MCS for the second channel.

9. The apparatus according to claim 1, wherein:
   the PPDU is an aggregated medium access control (MAC) protocol data unit (A-MPDU), and
   the processing circuitry is further configured to aggregate a plurality of MAC protocol data units (MPDUs) to generate the A-MPDU.

10. An apparatus of an access point (AP), the apparatus comprising: memory; and processing circuitry, configured to:
    perform channel sensing in a first channel of a first frequency band and a second channel of a second frequency band to obtain access for transmission of a physical layer convergence procedure (PLCP) protocol data unit (PPDU), the transmission of the PPDU configurable to use a multi-band layer-1 aggregation of the first and second channels, the PPDU comprising multiple subframes;
    if it is determined, based on the channel sensing of the first and second channels, that the first channel is available and that the second channel is unavailable:
    encode one or more of the subframes for transmission on the first channel without usage of the multi-band layer-1 aggregation while the second channel is unavailable;
    refrain from transmission of the subframes on the second channel while the second channel is unavailable;
    when it is determined that the second channel has become available, encode a header of one of the subframes transmitted on the first channel to indicate:
    a switch, by the AP, from transmission of the subframes on the first channel without multi-band layer-1 aggregation, to synchronized transmission of subframes on the first and second channels in accordance with the multi-band layer-1 aggregation,
    wherein:
    the plurality of subframes is a sequence of subframes,
    the subframes encoded for transmission on the first channel without the multi-band layer-1 aggregation are a first sub-sequence,
    the subframe for which the header is encoded to indicate the switch by the AP is a final subframe of the first sub-sequence, and
    the processing circuitry is further configured to encode, for the synchronized transmission on the first and second channels, a second sub-sequence of the subframes,
    wherein the second sub-sequence includes the subframes of the sequence that are not included in the first sub-sequence.

11. The apparatus according to claim 1, wherein:
    the first frequency band is in a range of 5 gigahertz (GHz) and the second frequency band is in a range of 6 GHz, or
    the first frequency band is in a range of 6 GHz and the second frequency band is in a range of 5 GHz.

12. The apparatus according to claim 1, wherein:
    the memory is configured to store at least a portion of the PPDU,
    the processing circuitry includes a baseband processor to encode the PPDU, and
    the apparatus includes a transceiver to transmit the PPDU.

13. A non-transitory computer-readable storage medium that stores instructions for execution by processing circuitry to perform operations for communication by an access point (AP), the operations to configure the processing circuitry to:
    perform channel sensing in a first channel of a first frequency band and a second channel of a second frequency band to obtain access for transmission of a physical layer convergence procedure (PLCP) protocol data unit (PPDU), the transmission of the PPDU configurable to use a multi-band layer-1 aggregation of the first and second channels, the PPDU comprising multiple subframes;
    encode the subframes for synchronized transmission on the first and second channels in accordance with the multi-band layer-1 aggregation,
    wherein the operations configure the processing circuitry to, for one of the subframes:
    generate a first orthogonal frequency division multiplexing (OFDM) signal for the first channel based on:
    a first plurality of bits, and
    a first per-band cyclic redundancy check (CRC) for the first channel, the first per-band CRC based on the first plurality of bits;
    generate a second OFDM signal for the second channel based on:
    a second plurality of bits, and
    a second per-band CRC for the second channel, the second per-band CRC based on the second plurality of bits.

14. The non-transitory computer-readable storage medium according to claim 13, the operations to further configure the processing circuitry to:
    encode one or more high efficiency (HE) headers to indicate:
    whether the subframes are encoded to include per-band CRCs, and
    a periodicity of the per-band CRCs in terms of a number of subframes.

15. The non-transitory computer-readable storage medium according to claim 13, the operations to further configure the processing circuitry to:
    for multiple subsets of the subframes, for each of the subsets:
    generate a first per-band CRC for the subframes of the subset; and
    generate a second per-band CRC for the subframes of the subset.

16. The non-transitory computer-readable storage medium according to claim 13, the operations to further configure the processing circuitry to:
   decode a block acknowledgement (BA) frame that indicates, for each of the subframes of the PPDU:
   whether the subframe was successfully decoded, and
   for each of the first and second channels, results related to a CRC check of the corresponding per-band CRC.

17. An apparatus of a station (STA), the apparatus comprising: memory; and processing circuitry, configured to:
   during a first period before transmission of a physical layer convergence procedure (PLCP) protocol data unit (PPDU) in accordance with a multi-band layer-1 aggregation of a first channel in a first frequency band and a second channel in a second frequency band, the PPDU comprising a plurality of subframes:
   sense the first channel to determine if the first channel is available;
   sense the second channel to determine if the second channel is available;
   if it is determined in the first period that the first channel is available and that the second channel is unavailable, during a second period after the first period:
   encode a first subset of the subframes of the PPDU for transmission on the first channel without usage of the multi-band layer-1 aggregation;
   refrain from transmission of the subframes on the second channel;
   sense the second channel until it is determined that the second channel has become available;
   when it is determined that the second channel has become available, encode a header of one of the subframes of the first subset to indicate that, during a third period after the second period, the STA is to transmit a second subset of the subframes of the PPDU on the first and second channels in accordance with the multi-band layer-1 aggregation,
   wherein during the third period, as part of the multi-band layer-1 aggregation, the processing circuitry is further configured to:
   generate orthogonal frequency division multiplexing (OFDM) signals for transmission on the first and second channels; and
   synchronize starting OFDM symbol periods of the OFDM signals for the transmission on the first and second channels, and
   wherein the memory is configured to store at least a portion of the PPDU.

* * * * *